United States Patent [19]

Batesky et al.

[11] 3,855,238

[45] Dec. 17, 1974

[54] PROCESS FOR PREPARING N-TERTIARY-BUTOXYCARBONYL AMINO ACIDS

[75] Inventors: Donald C. Batesky; William C. Schultz, both of Rochester, N.Y.

[73] Assignee: Eastman Kodak Company, Rochester, N.Y.

[22] Filed: June 28, 1971

[21] Appl. No.: 157,606

Related U.S. Application Data

[63] Continuation-in-part of Ser. No. 80,797, Oct. 14, 1970, abandoned.

[52] U.S. Cl. ...... 260/326.14 T, 260/112.5, 260/309, 260/326.2, 260/455 B, 260/470, 260/471 C, 260/481 C, 260/482 C

[51] Int. Cl. ............................................ C07d 27/60

[58] Field of Search ....... 260/326.14 T, 516, 471 C, 260/482 C, 326.3, 534 C, 112.5, 309, 326.2

[56] References Cited

UNITED STATES PATENTS

| | | | |
|---|---|---|---|
| 3,264,279 | 8/1966 | Schwyzer et al. | 260/112.5 |
| 3,325,466 | 6/1967 | Anderson | 260/112.5 |
| 3,609,164 | 9/1971 | Miyoshi et al. | 260/309 |

FOREIGN PATENTS OR APPLICATIONS

1,166,403   10/1969   Great Britain

*Primary Examiner*—Lorraine A. Weinberger
*Assistant Examiner*—Paul J. Killos
*Attorney, Agent, or Firm*—H. M. Chapin

[57] ABSTRACT

Amino acids are converted to their N-tertiary-butoxycarbonyl derivatives, which are especially useful for synthesis of polypeptides, by reacting a base addition salt of the amino acid with O-tertiary-butyl S-phenyl thiocarbonate.

20 Claims, No Drawings

PROCESS FOR PREPARING N-TERTIARY-BUTOXYCARBONYL AMINO ACIDS

CROSS REFERENCE TO RELATED APPLICATION

This application is a continuation-in-part of copending application Ser. No. 80,797, filed Oct. 14, 1970, now abandoned.

FIELD OF THE INVENTION

This invention relates in general to N-blocked amino acids and in particular to the N-blocking of amino acids with a tertiary-butoxycarbonyl radical. More specifically, this invention relates to a novel process for preparing N-tertiarybutoxycarbonyl amino acids in which O-tertiary-butyl S-phenyl thiocarbonate is used to introduce the tertiary-butoxycarbonyl radical.

BACKGROUND OF THE INVENTION

N-blocked amino acids, i.e., amino acids having an amino-protecting group, are widely used in the field of biochemistry and a number of different bulky radicals have been employed as the protective group. Use of a tertiary-butoxycarbonyl moiety as the amino-protecting group is of particular importance in the syntheses of polypeptides from amino acids, especially by the "solid phase" method of Merrifield (see Merrifield, R. B. et al., Anal. Chem. 38 1905, 1966 and Majjar, V. A. et al., Biochem. 5 3765, 1966). The N-tertiary-butoxycarbonyl amino acids are commonly known as $t$-Boc amino acids, and several methods have been described for their preparation. For example, it is known to prepare $t$-Boc amino acids by reaction of an amino acid with $t$-butylazidoformate (see Schwyzer, R. et al., Helv. Chim. Acta. 42 2622, 1959) or with $t$-butylcyanoformate (see Carpino, L. A., J. Am. Chem. Soc. 82 2725, 1960). It is also known to prepare $t$-Boc amino acids by reaction of an amino acid with an aryl carbonate of $t$-butyl alcohol, such as $t$-butyl phenyl carbonate (see Carpino, L. A., J. Am. Chem. Soc. 79 98, 1957) or $t$-butyl $p$-nitrophenyl carbonate (see Anderson G. W. et al., J. Am. Chem. Soc. 79 6180 1957) or $t$-butyl 2,4,5-trichlorophenyl carbonate (see British patent number 1,166,403 to Broadbent and Morley published October 8, 1969).

SUMMARY OF THE INVENTION

It has now been discovered that $t$-Boc amino acids can be prepared by reaction of am amino acid with O-tertiary-butyl S-phenyl thiocarbonate and that this method provides significant advantages over methods known heretofore for the preparation of $t$-Boc amino acids. Thus, for example, O-tertiary-butyl S-phenyl thiocarbonate is easily prepared by relatively simple reaction procedures from readily available starting materials which are generally of lower cost than the starting materials needed to prepare the carbo-$t$-butoxylating agents of the prior art. O-tertiary-butyl S-phenyl thiocarbonate is not hazardous to use, whereas use of $t$-butyl azidoformate or $t$-butyl cyanoformate poses serious hazards in view of the fact that these compounds are unstable and highly toxic. As compared to the aryl carbonates of butyl alcohol heretofore employed, use of the O-tertiary-butyl S-phenyl thiocarbonate of this invention as a carbo-$t$butoxylating agent for amino acids greatly facilitates and simplifies recovery of the $t$-Boc amino acid. For example, when O-tertiary-butyl S-phenyl thiocarbonate is used as a carbo-$t$-butoxylating agent, the leaving group is thiophenol which, under the usual reaction conditions, is oxidized to phenyl disulfide which is removed in the extraction step normally performed to remove the excess carbo-$t$-butoxylating agent. In contrast, when $t$-butyl phenyl carbonate is used, an additional step must be performed to remove the phenol produced as a by-product and when $t$-butyl $p$-nitrophenyl carbonate, or $t$-butyl 2,4,5-trichlorophenyl carbonate are used, a neutralization step is also necessary to convert the phenolic leaving group to the free phenol.

DETAILED DESCRIPTION OF PREFERRED EMBODIMENTS

A suitable procedure for preparing O-tertiarybutyl S-phenyl thiocarbonate is to react benzenethiol with phosgene in the presence of an amine, such as triethylamine, pyridine or N,N-dimethylaniline, to produce phenyl chlorothioformate and the hydrochloride of the amine and then react the phenyl chlorothioformate with $t$-butyl alcohol in the presence of an amine to form the amine hydrochloride and O-tertiary-butyl S-phenyl thiocarbonate.

To prepare the n-tertiary-butoxycarbonyl amino acid, the O-tertiary-butyl S-phenyl thiocarbonate is reacted with a base addition salt of the corresponding amino acid. In peptide synthesis, the amino acids can be employed as such or in the form of derivatives, such as the ester derivatives, and, accordingly, the term "amino acid," as employed herein, is intended to include both the amino acids themselves and the derivatives thereof which are used in peptide synthesis and for this reason benefit particularly from the protection afforded by introduction of a tertiary-butoxycarbonyl radical. Illustrative examples of amino acids and their derivatives which can be utilized in the process of this invention include: L-Phenylalanine, L-Valine, S-Benzyl-L-Cysteine, L-Alanine, L-Isoleucine, L-Glutamine, L-Leucine, L-Methionine, L-Asparagine, L-Proline, L-Tyrosine, L-Serine, L-Nitroarginine, L-Tryptophan, L-Glutamic Acid, Glycine, L-$\alpha$-Aminobutyric Acid, L-Aspartic Acid$\beta$-Benzyl Ester, S-Benzyl-L-Cysteine, S-CBZ-L-Cysteine, L-Glutamic Acid$\alpha$-Benzyl Ester, L-Glutamic Acid$\gamma$-Benzyl Ester, L-Cystine, $N^{IM}$-Benzyl-L-Histidine, $N^{IM}$-Tosyl-L-Histidine, L-Histidine, L-Hydroxyproline, L-Lysine, $\alpha$-CBZ-L-Lysine, $\gamma$-CBZ-L-Lysine, L-Methionine Sulfoxide, L-Norleucine, L-Ornithine, N-p-Tosyl-L-Arginine, L-Threonine, $\epsilon$-Trifluoroacetyl-L-Lysine, O-Benzyl-L-Serine, O-Benzyl-L-Tyrosine, Aspartic Acid, and the like.

As previously indicated, the amino acid is employed in the form of a base addition salt in carrying out the reaction with the O-tertiary-butyl S-phenyl thiocarbonate. The reaction can be carried out by using a preformed base addition salt, but it will ordinarily be more convenient to merely add the base to the reaction mixture containing the amino acid and the O-tertiary-butyl S-phenyl thiocarbonate. A number of different bases can be used for this purpose including sodium hydroxide, ammonium hydroxide, triethylamine, tributylamine, 1,1,3,3-tetramethylguanidine and benzyltrimethylammonium hydroxide. The base must be strong enough to form a salt with the carboxylic acid function of the amino acid yet it should not bring about racemization of the amino acid, as this will cause the resulting $t$-Boc amino acid to be optically inactive and therefore unsuitable for use in peptide synthesis. Additional requirements are that the base should not be one which reacts with the O-tertiary-butyl S-phenyl thiocarbonate and that its addition salt with the amino acid should be adequately soluble in the reaction medium. All of these requirements are not easily met. For example, triethylamine and tributylamine salts of amino acids are not always as soluble as would be desirable while ammonium hydroxide tends to be reactive toward O-tertiary-butyl S-phenyl thiocarbonate. Benzyltrimethylammonium hydroxide and 1,1,3,3-tetramethylguanidine do not exhibit these shortcomings and provide very good yields of product, but suffer from the disadvantage that in some cases they can racemize the amino acid, thereby causing a loss of optical activity of the product. Accordingly, a few experiments may be necessary to establish the base which is best suited for use with a particular amino acid.

Amine bases are particularly desirable in the process of this invention since they catalyze the oxidation of the thiophenol formed in the reaction to phenyl disulfide and thereby promote ease of separation of the by-product from the product. However, the amine should be a tertiary amine or a quarternary ammonium compound since primary and secondary amines tends to react with O-tertiary-butyl S-phenyl thiocarbonate.

O-tertiary-butyl S-phenyl thiocarbonate may be prepared by the following reaction sequence:

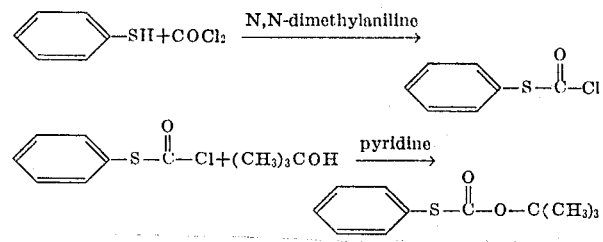

EXAMPLE 1

In a 2-liter flask, set in a dry ice cooling bath and equipped with a stirrer, thermometer and gas addition tube, there were placed 220 grams (2.0 moles) of benzenethiol and 1200 milliliters of ethyl ether. The solution was cooled to 5°C and stirred while 240 grams (2.4 moles) of phosgene was bubbled in, maintaining the temperature at 5° to 10°c. To the resulting solution there was added, over a period of 1 hour, 242 grams (2.0 moles) of N,N-dimethylaniline. The mixture was stirred at room temperature overnight and the N,N-dimethylaniline hydrochloride which formed was filtered from the mixture. The filtrate was then concentrated at reduced pressure to remove the ethyl ether and give a quantitative yield of crude phenyl chlorothioformate which was purified by distillation, collecting the fraction boiling at 87°C/4mm. In a 5-liter flask, equipped with a stirrer, thermometer, reflux condenser and dropping funnel, there was placed 400 grams (4.8 moles) of tertiary-butyl alcohol, 400 grams (5.1 moles) of pyridine and 1600 milliliters of chloroform. To the stirred solution there was added from the dropping funnel, over a 2-hour period, 620 grams (3.6 moles) of distilled phenyl chlorothioformate prepared as aforesaid. The stirred mixture was refluxed for 3 hours and then cooled to room temperature. The resulting solution was washed twice with water to remove the pyridine hydrochloride formed in the reaction, once with dilute hydrochloric acid, again with water, and finally with dilute sodium bicarbonate solution. The solution was dried over anhydrous magnesium sulfate, filtered, and the solvent evaporated at reduced pressure to give 740 grams of O-tertiary-butyl S-phenyl thiocarbonate, which is equal to 97 percent of the theoretical yield.

The reaction of the amino acid and the O-tertiarybutyl S-phenyl thiocarbonate is advantageously carried out in dimethyl sulfoxide or other similarly strongly polar solvents. The O-tertiary-butyl S-phenyl thiocarbonate should be employed in an amount somewhat in excess of stiochiometric, e.g., about 1.1 to about 1.3 moles per mole of the amino acid, while the ratio of base to amino acid is advantageously about 2 to 1 on a molar basis.

The reaction of the amino acid and the O-tertiarybutyl S-phenyl thiocarbonate can be carried out over a wide range of temperatures and at pressures from sub-atmospheric to super-atmospheric, as desired. Reaction temperatures will ordinarily be in the range from about 25° to about 65°C. The time required for completion of the reaction will vary from several hours to several days depending on the amino acid and base involved and the reaction temperature employed.

Recovery of the N-tertiary-butoxycarbonyl amino acid is readily accomplished by adding water to the reaction mixture. The unoxidized thiophenol which is formed as a by-product in the reaction is oxidized to phenyl disulfide by the addition of 30% hydrogen peroxide while the pH is maintained at 8–10 by additions of hydrochloric acid. The solution is extracted with ethyl ether to remove the phenyl disulfide and unreacted O-tertiary-butyl S-phenyl thiocarbonate. The product is purified by recrystallization.

The invention is further illustrated by the following examples.

EXAMPLE 2

In a beaker were placed 8.9 gm (0.1 mole) of L-alanine, 50 ml of dry dimethyl sulfoxide, 23 gm (0.2 mole) of 1,1,3,3-tetramethylguanidine and 25 gm (0.12 mole) of O-tert.-butyl S-phenylthiocarbonate. The mixture was stirred and heated in a constant temperature bath at 55° for 20 hrs. To the solution was added 150 ml of ice water containing 3 ml of concentrated hydrochloric acid. The pH of the solution was then rapidly brought to between 8–10 by adding 6N hydrochloric acid solution. Hydrogen peroxide (30 percent) was then added dropwise to the solution until the pH no longer increased after each addition. The pH of the solution was maintained at 8–10 by adding 6N hydrochloric acid solution between the hydrogen peroxide additions. The reaction solution was extracted with two portions of ethyl ether to remove the by-product, phenyl disulfide then chilled to 0°C, saturated with sodium chloride and brought to a pH of 3 with concentrated citric acid solution. The solution was extracted with four portions of ethyl acetate to obtain the product. The extractions were dried over anhydrous magnesium sulfate and the solvent removed under vacuum leaving the product, N-tert. -butoxycarbonyl-L-alanine. The yield of crude product was 16 gm which is 84 percent of the theoretical amount.

EXAMPLE 3

In a manner similar to Example 1, 0.1 mole of the amino acids of Table I were reacted with 0.11 mole of O-tertiary-butyl S-phenyl thiocarbonate and 0.2 mole of 1,1,3,3-tetramethylguanidine to produce the corresponding N-t-Boc amino acid. Dimethyl sulfoxide was used as the reaction solvent in the amount specified in Table I. The reaction times, temperatures and yields are indicated in Table I.

Table I

| Amino Acid | Solvent | Reaction time | | Reaction Temperature | Crude Yield |
|---|---|---|---|---|---|
| L-Phenylalanine | 150 ml | 24 hr. | | 35° | 95% |
| L-Valine | 100 ml | 20 hr. | at | 25° | |
| | | then | | | |
| | | 3 hr. | at | 50° | 90% |
| S-Benzyl-L-Cysteine | 100 ml | 24 hr. | | 25° | 75% |
| L-Alanine | 50 ml | 20 hr. | | 60° | 84% |
| L-Isoleucine | 30 ml | 20 hr. | at | 25° | |
| | | then | | | |
| | | 2 hr. | at | 45° | 100% |
| L-Glutamine | 50 ml | 20 hr. | | 25° | 57% |
| L-Leucine | 50 ml | 20 hr. | | 65° | 65% |
| L-Methionine | 50 ml | 20 hr. | | 55° | 60% |
| L-Asparagine | 50 ml | 3 hr. | at | 50° | |
| | | then | | | |
| | | 20 hr. | at | 25° | 65% |
| N⁶-CBZ-L-Lysine | 75 ml | 3 hr. | at | 55° | |
| | | then | | | |
| | | 5 days | at | 25° | 100% |
| L-Tyrosine* | 50 ml | 5 days | | 25° | 100% |
| L-Serine | 50 ml | 1 hr. | at | 50° | |
| | | then | | | |
| | | 3 days | at | 25° | 95% |
| L-Nitroarginine | 100 ml | 1 hr. | at | 40° | |
| | | then | | | |
| | | 3 days | at | 25° | 75% |
| L-Tryptophan | 50 ml | 2 days | | 25° | 100% |

*0.16 mole of tetramethylguanidine was used in the case of L-Tyrosine

The reaction of the amino acid and the O-tertiary-butyl S-phenyl thiocarbonate may also be carried out in a mixture of water and water-miscible organic solvent to which the base has been added. The O-tertiary-butyl S-phenyl thiocarbonate should be employed in an amount somewhat in excess of stoichiometric, e.g., about 1.1 to about 1.3 moles per mole of the amino acid, while the ratio of base to amino acid is advantageously in the range from about 1 to 1 to about 2.5 to 1 on a molar basis. Suitable organic solvents for forming the reaction mixture include lower alkanols, such as methanol, ethanol, isopropanol or t-butanol; ethers such as tetrahydrofuran or 1,4-dioxane; amides such as N,N-dimethylformamide; sulfoxides such as dimethyl sulfoxide; nitriles such as acetonitrile; and esters such as ethyl acetate. While the particular solvent used is not critical, complete solubilization of all of the starting materials in the reaction medium is desirable to promote high yields of the product.

The reaction of the amino acid and the O-tertiary-butyl S-phenyl thiocarbonate can be carried out over a wide range of temperatures and at pressures from sub-atmospheric to super-atmospheric, as desired. Reaction temperatures will ordinarily be in the range from about 35° to about 100°C, and more suitably in the range from about 60° to about 85°C. The time required for completion of the reaction will vary from several hours to several days depending on the amino acid and base involved and the reaction temperature employed. Recovery of the N-tertiary-butoxycarbonyl amino acid is readily accomplished by concentrating the reaction mixture by evaporation, removing the excess O-tertiary-butyl S-phenyl thiocarbonate and phenyl disulfide by-product by extraction, and purifying the product by recrystallization or through formation of its dicyclohexylamine salt.

The invention is further illustrated by the following examples of its practice.

EXAMPLE 4

The O-tertiary-butyl S-phenyl thiocarbonate obtained from the procedure of Example 1 was used to prepare the tertiary-butoxycarbonyl derivative of L-alanine in accordance with the following reaction equation:

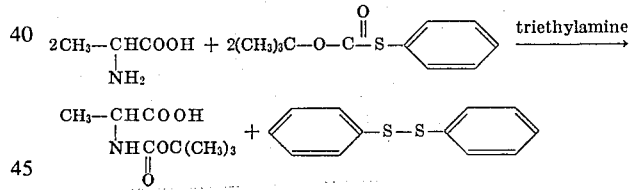

In carrying out this reaction, 0.05 mole of L-alanine, 20 milliliters of triethylamine and 0.057 mole of O-tertiary-butyl S-phenyl thiocarbonate were added to a mixture of 10 milliliters of water and 50 milliliters of t-butanol and the reaction mixture was heated with continuous stirring at 80°C for 18 hours. The resulting solution was concentrated at reduced pressure to remove most of the solvent. Water in an amount of 50 milliliters was added and the mixture extracted twice with small portions of ethyl ether to remove phenyl disulfide (formed by air oxidation of the benzenethiol given off during the reaction) and unreacted O-tertiary-butyl S-phenyl phenyl thiocarbonate. The extracted aqueous layer was chilled to 0°C, saturated with sodium chloride, and the pH adjusted to about 3 with aqueous citric acid. The product was extracted with two portions of ethyl acetate and then with ethyl ether. The extracts were combined, dried over anhydrous magnesium sulfate, filtered and the solvents removed at reduced pressure to leave the crude tertiary-butoxycarbonyl derivative of L-alanine which was purified by recrystallization from a mixture of ethyl ether and petroleum ether. The yield was equal to 40 % of theoretical.

EXAMPLE 5

In a similar manner to that described in Example 4, L-phenylalanine was reacted with O-tertiary-butyl S-phenyl thiocarbonate to produce the corresponding N-t-Boc amino acid using as the reaction solvent a mixture of 20 milliliters of water and 50 milliliters of 1,4-dioxane and a reaction temperature of 84°C. The yield obtained in a reaction period of 18 hours was equal to 50 percent of theoretical.

EXAMPLE 6

In a similar manner to that described in Example 4, L-proline was reacted with O-tertiary-butyl S-phenyl thiocarbonate to produce the corresponding N-t-Boc amino acid using as the reaction solvent a mixture of 12 milliliters of water and 75 milliliters of t-butanol and a reaction temperature of 65°C. The yield obtained in a reaction period of 16 hours was equal to 80 percent of theoretical.

EXAMPLE 7

In a similar manner to that described in Example 4, L-isoleucine was reacted with O-tertiary-butyl S-phenyl thiocarbonate to produce the corresponding N-t-Boc amino acid using as the reaction solvent a mixture of 10 milliliters of water and 40 milliliters of ethanol and a reaction temperature of 80°C. The yield obtained in a reaction period of 24 hours was equal to 40 percent of theoretical.

EXAMPLE 8

In a similar manner to that described in Example 4, L-tryptophan was reacted with O-tertiary-butyl S-phenyl thiocarbonate to produce the corresponding N-t-Boc amino acid using as the reaction solvent a mixture of 20 milliliters of water and 50 milliliters of t-butanol and a reaction temperature of 80°C. The yield obtained in a reaction period of 64 hours was equal to 60 percent of theoretical.

EXAMPLE 9

In a similar manner to that described in Example 4, glycine was reacted with O-tertiary-butyl S-phenyl thiocarbonate to produce the corresponding N-t-Boc amino acid using as the reaction solvent a mixture of 10 milliliters of water and 50 milliliters of t-butanol and a reaction temperature of 80°C. In place of the 20 milliliters of triethylamine that was employed in each of Examples 4 to 8, there was substituted 9 milliliters of 1,1,3,3-tetramethylguanidine. The yield obtained in a reaction period of 72 hours was equal to 60 percent of theoretical.

The reaction of the amino acid and the O-tertiary-butyl S-phenyl thiocarbonate may also be carried out in a solvent to which the base is added dropwise during the course of the reaction. The pH of the reaction mixture is continuously monitored and the base is added at such a rate so as to maintain the pH at about 10. In this manner racemization which occurs at higher pH's is minimized. The reaction mixture is then treated with hydrogen peroxide as in Example 2 and the N-t-boc amino acid recovered.

The following Examples 10 and 11 further illustrate the above reaction.

EXAMPLE 10

A mixture of 15g (0.1 mole) of L-methionine, 100 ml of methanol and 25 ml (0.11 mole) of O-tert.-butyl S-phenylthiocarbonate was heated with stirring at 40° to 50°. To the mixture was added dropwise 1,1,3,3-tetramethylguanidine at a rate sufficient to maintain the pH of the solution at about 10. After 6 hours the pH of the solution had ceased to drop so the addition of 1,1,3,3-tetramethylguanidine was terminated. About 11g had been added. The solution was then heated at 40° overnight. It was then treated with hydrogen peroxide and worked up in the fashion of Example 2. The yield of crude product was 13g which is 52 percent of theoretical.

EXAMPLE 11

In a manner similar to Example 10 the amino acids and bases of Table II were reacted in the indicated solvent and the indicated yields obtained.

Table II

| Amino Acid | Solvents | Base | Yield |
|---|---|---|---|
| L-Nitroarginine | 75% methanol | TMG* | 60% |
| L-Leucine | methanol | Triton "B"** | 60% |
| L-Glutamic acid | 75% methanol | TMG | 68% |
| L-Valine | 75% ethanol | TMG | 44% |
| L-Alanine | 75% methanol | TMG | 65% |
| L-Phenylalanine | 75% methanol | TMG | 57% |
| S-Benzyl-L-Cysteine | 75% dioxane dimethyl-sulfoxide | TMG | 34% |
| L-Isoleucine |  | Triton "B" | 78% |

*TMG is 1,1,3,3-tetramethylguanidine
**Triton "B" is Benzyltrimethylammonium hydroxide 40% in methanol The yields indicated are crude yields which can be purified by conventional methods, such as crystallization. The compounds thus made and purified showed good optical purity.

The invention has been described in detail with particular reference to preferred embodiments thereof, but it will be understood that variations and modifications can be effected within the spirit and scope of the invention.

We claim:

1. A process for preparing an N-tertiarybutoxycarbonyl amino acid which comprises the step of reacting a base addition salt of an amino acid with O-tertiary-butyl S-phenyl thiocarbonate to form thereby the corresponding N-tertiarybutoxycarbonyl amino acid.

2. A process for preparing an N-tertiarybutoxycarbonyl amino acid which comprises the steps of (1) heating a solution of an amino acid, a base, and O-tertiary-butyl S-phenyl thiocarbonate in a solvent for a sufficient period of time to form the corresponding N-tertiarybutoxycarbonyl amino acid and (2) recovering the N-tertiarybutoxycarbonyl amino acid produced thereby.

3. The process as described in claim 2 wherein said base is a tertiary amine base.

4. The process as described in claim 2 wherein said solvent is a mixture of water and a lower alkanol of 1 to 4 carbon atoms.

5. The process as described in claim 2 wherein said solution is maintained at a temperature in the range from about 35° to about 100°C during the reaction period.

6. The process as described in claim 2 wherein said solution is maintained at a temperature in the range from about 60° to about 85°C during the reaction period.

7. The process as described in claim 2 wherein said solvent is dimethyl sulfoxide.

8. The process as described in claim 7 wherein said solution is maintained at a temperature in the range from about 25° to about 65°C during the reaction period.

9. The process as described in claim 2 wherein said amino acid is L-alanine and said base is triethylamine.

10. The process as described in claim 2 wherein said amino acid is L-phenylalanine and said base is triethylamine.

11. The process as described in claim 2 wherein said amino acid is L-proline and said base is triethylamine.

12. The process as described in claim 2 wherein said amino acid is L-isoleucine and said base is triethylamine.

13. The process as described in claim 2 wherein said amino acid is L-tryptophan and said base is triethylamine.

14. The process as described in claim 2 wherein said amino acid is glycine and said base is 1,1,3,3-tetramethylguanidine.

15. The process for preparing an N-tertiary-butoxycarbonyl amino acid which comprises the steps of heating a solution of amino acid, a base, and O-tertiary-butyl S-phenyl thiocarbonate in a solvent for a sufficient period of time to form the corresponding N-tertiary-butoxycarbonyl amino acid, adding water and hydrogen peroxide to the reaction mixture to oxidize unoxidized thiophenol while maintaining the pH at 8–10 by adding hydrochloric acid to the reaction mixture, and recovering the N-tertiary-butoxycarbonyl amino acid produced thereby.

16. The process as described in claim 15 wherein said solvent is dimethyl sulfoxide.

17. The process as described in claim 15 wherein said amino acid is selected from the group consisting of L-Phenylalanine, L-Valine, S-Benzyl-L-Cysteine, L-Alanine, L-Isoleucine, L-Glutamine, L-Leucine, L-Methionine, L-Asparagine, $N^6$-CBZ-L-Lysine, L-Tyrosine, L-Serine, L-Nitroarginine, and L-Tryptophan.

18. A process in accordance with claim 2 wherein said amino acid is selected from the group consisting of L-Phenylalanine, L-Valine, S-Benzyl-L-Cysteine, L-Alanine, L-Isoleucine, L-Glutamine, L-Leucine, L-Methionine, L-Asparagine, L-Proline, L-Tyrosine, L-Serine, L-Nitroarginine, L-Tryptophan, L-Glutamic Acid, Glycine, L-$\alpha$-Aminobutyric Acid, L-Aspartic Acid $\beta$-Benzyl Ester, S-Benzyl-L-Cysteine, S-CBZ-L-Cysteine, L-Glutamic Acid $\alpha$-Benzyl Ester, L-Glutamic Acid $\gamma$-Benzyl Ester, L-Cystine, $N^{IM}$-Benzyl-L-Histidine, $N^{IM}$-Tosyl-L-Histidine, L-Histidine, L-Hydroxyproline, L-Lysine, $\alpha$-CBZ-L-Lysine, $\gamma$-CBZ-L-Lysine, L-Methionine Sulfoxide, L-Norleucine, L-Ornithine, N-p-Tosyl-L-Arginine, L-Threonine, $\epsilon$-Trifluoroacetyl-L-Lysine, O-Benzyl-L-Serine, O-Benzyl-L-Tyrosine, and Aspartic Acid; wherein the reaction temperature is between about 25° and 100°C;

wherein said solvent is a strongly polar organic solvent in which the starting materials are soluble; and wherein about 1 mol of amino acid is present to between about 1.1 and 1.3 moles of O-tertiary-butyl S-phenyl thiocarbonate.

19. A process in accordance with claim 18, wherein said solvent is at least one member selected from the group consisting of methanol, ethanol, isopropanol, t-butanol, tetrahydrofuran, 1.4-dioxane, N,N-dimethylformamide, dimethyl sulfoxide, acetonitrile and ethyl acetate.

20. A process in accordance with claim 19, wherein said amino acid and said base are present in a ratio of between about 1 mol of amino acid to between about 1 to 2.5 mols of base.

* * * * *

UNITED STATES PATENT OFFICE
CERTIFICATE OF CORRECTION

PATENT NO. : 3,855,238
DATED : December 17, 1974
INVENTOR(S) : Donald C. Batesky, William C. Schultz It is certified that error appears in the above-identified patent and that said Letters Patent are hereby corrected as shown below:

Col. 1, line 49, "am" should read --an--.
Col. 5, Table I, first line, after "Reaction Temperature insert --°C.--.
Col. 6, line 40 $\overset{O}{"}$ should be from the "C".
Col. 6, line 42, "CH$_3$" should read --2CH$_3$--.
Col. 6, line 59, delete "phenyl" (second occurrence).

Signed and sealed this 6th day of May 1975.

(SEAL)
Attest:

RUTH C. MASON
Attesting Officer

C. MARSHALL DANN
Commissioner of Patents
and Trademarks